BEST AVAILABLE COPY

P. MARKLEY.

GATE.

No. 11,643. Reissued Dec. 28, 1897.

Witnesses.

E. A. Baker.

E. Kaufell

Inventor:

Philemon Markley

THE NORRIS PETERS CO., PHOTO-LITHO., WASHINGTON, D. C.

2 Sheets—Sheet 2.

P. MARKLEY.

GATE.

No. 11,643. Reissued Dec. 28, 1897.

Witnesses.

E. A. Wafer,

Inventor.

Philemon Markley

THE NORRIS PETERS CO., PHOTO-LITHO., WASHINGTON, D. C.

UNITED STATES PATENT OFFICE.

PHILEMON MARKLEY, OF GIRARD, KANSAS.

GATE.

SPECIFICATION forming part of Reissued Letters Patent No. 11,643, dated December 28, 1897.

Original No. 584,092, dated June 8, 1897. Application for reissue filed November 27, 1897. Serial No. 659,991.

*To all whom it may concern:*

Be it known that I, PHILEMON MARKLEY, a citizen of the United States, residing at Girard, in the county of Crawford and State of Kansas, have invented certain new and useful Improvements in Gates for Use on Farms or Elsewhere, of which the following is a specification.

My invention is constructed on the principle of gravity and is operated by means of levers and wires.

Figure 1:
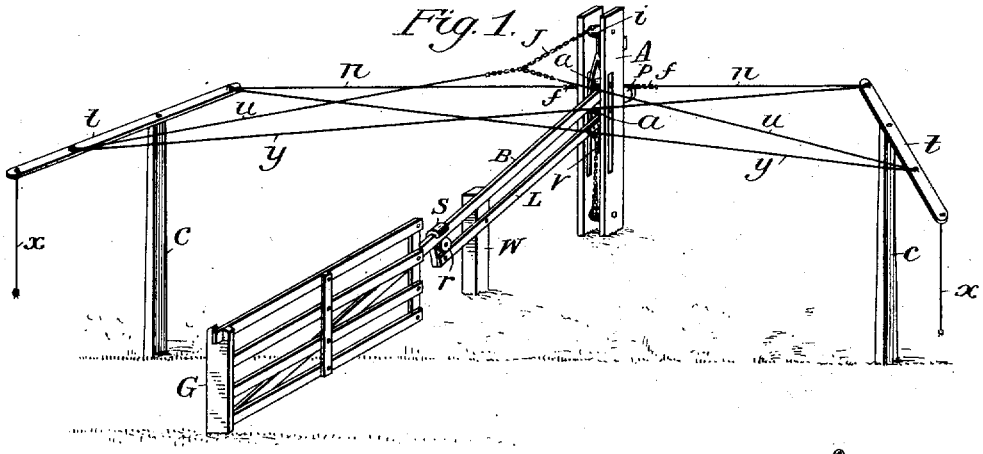
Figure 2:
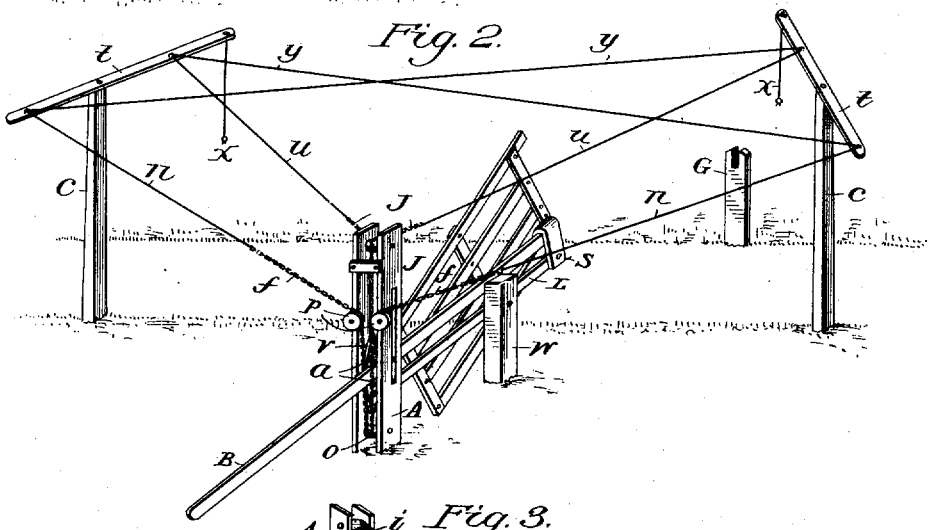
Figure 3:
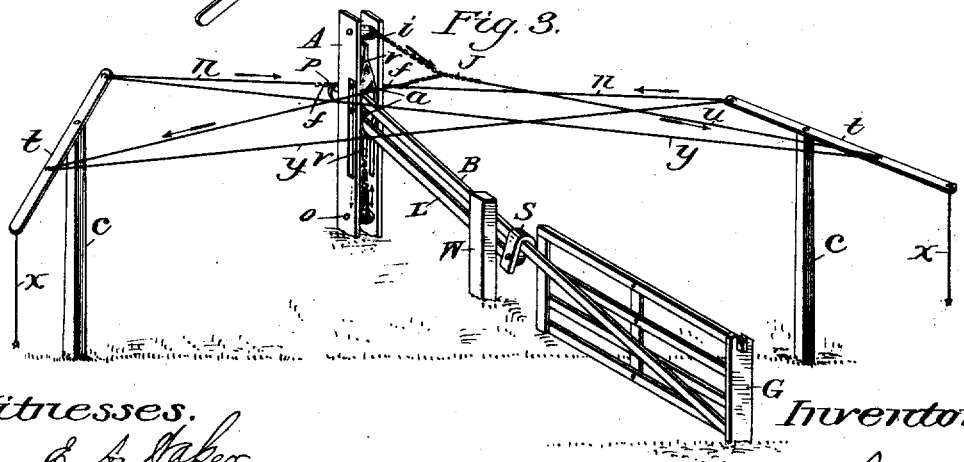

Figures 1 and 3 show perspective views of the gate closed, taken from opposite sides, and the arrangement and operation of the wires. Fig. 2 shows a perspective view of the gate open; and Fig. 4, a perspective view of the post A, one side of it being removed so as to show the yoke V and the different pulleys.

To enable others to make and use my invention, I will describe its construction and operation.

The gate H is constructed either of wood or metal, with a beam diagonally and permanently attached thereto. This beam (designated as B) is about twice the length of the gate, but may be shorter or longer, and reaches to and through post A, as seen in Figs. 1 and 3, and bears upon roller *r*, which when the gate is closed is midway of the beam, or nearly so. When the gate is open, it rests as seen in Fig. 2. This beam is not only a firm brace to the gate, but a fixed part of the same, which never changes position in respect to it, and serves as a guide for it during its travel.

L is a lever-bar for raising and lowering the gate, and is attached to the lower end of yoke V and to post W at a proper height by a bolt, which allows it to turn and give the gate an up-and-down movement with itself. It will be seen that the long end of lever-bar L has a joint attachment to the lower end of yoke V, and the short end is provided with the support S, to which the roller *r* is attached for the support and slide of the gate. This lever-bar has an up-and-down movement only, while the beam B has this movement and a horizontal movement also.

Figure 4:
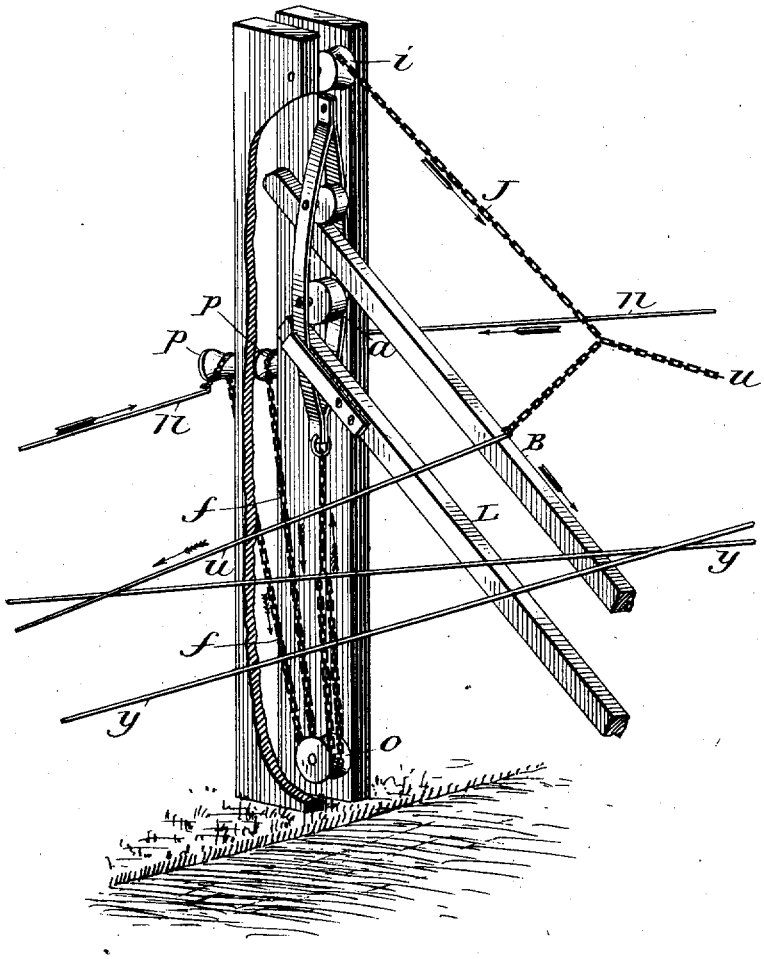

The post A is made of two pieces, with a sufficient space between for the yoke V to have an easy up-and-down movement and is provided with the necessary slots for guiding the same. The post is also provided with pulleys *i*, *p p*, and *o* for the support of the chains in operating the gate, as seen in the drawings. The yoke V is constructed the proper size to contain the rollers *a a*, placed at a suitable distance apart to admit the easy passage of the beam B. These rollers are journaled in the yoke, and their journals project through the slots of post A, which serve as guides to the yoke. For the operation of the gate the levers *t t* are connected with both ends of the yoke by wires and chains, the chain J with the upper end and the chains *f f* with the lower end, as seen in Fig. 4.

The posts *c c*, to which are attached levers *t t*, are placed at suitable distances inside and outside of the gate to admit vehicles without their interference with the gate's operation.

The diagonal wires *y y* are connected to levers *t t* at an equal distance each side of their pivots and secure uniformity in the operation of wires *u u* and *n n*, by which the gate is operated.

The wires *u u* are attached to levers *t t* in front and to chain J at the rear, which chain passes over roller *i* and is attached to the top of yoke V. It will be seen that chain J is a branched chain, as shown in Figs. 1 and 3. The wires *n n* are attached to the rear of levers *t t* and to separate chains *f f*, which chains pass over rollers *p p* and down and around roller *o* to the lower end of yoke V, as more fully seen in Fig. 3. The ropes X X are for the handling of levers *t t* in opening and closing the gate.

I will now describe the operation of the gate. It will be seen that the wires *n n*, being attached to chains *f f*, (which chains pass down and around roller *o* and are attached to the lower end of yoke V,) pulling either of the ropes X X toward the gate will lower the rear end of beam B, throw the gate up in front, and cause it to slide back to its open position, as seen in Fig. 2; and the wires *u u*, being attached to chain J and chain J to the top of yoke V, pulling either of the ropes X X from the gate will raise the rear end of the same and cause it to slide forward to its closed position, as seen in Fig. 1.

To open the gate, pull the rope toward the gate, and when through pull the rope from the gate to close it.

The great advantage of this gate over others consists in its easy operation, durability, and protection against the obstruction of snow. The gate's having no hinges or sagging weight, being poised on roller *r* at or near the center of beam B and left free to slide either way in its operation, renders it more durable than other gates, and by the means of lever-bar L and levers *t t* all necessary leverage can be had for raising and lowering the same.

What I claim as my invention, and desire to secure by Letters Patent, is—

The combination of a gate having the rearwardly-prolonged diagonal brace-bar B, with the lever L, pivoted upon the rear gate-post and provided with guide S, and roller *r*; a supplementary post carrying movable guides for brace B, and means connected with these guides for together operating both lever L, and the guides, all substantially as set forth.

PHILEMON MARKLEY.

Witnesses:
E. A. WAPER,
D. C. FLINT.